United States Patent [19]

Steele et al.

[11] Patent Number: 4,809,314

[45] Date of Patent: Feb. 28, 1989

[54] METHOD OF ALIGNING A LINEAR ARRAY X-RAY DETECTOR

[75] Inventors: Douglas S. Steele, Fairfield, Ohio; John P. Keaveney; David W. Oliver, both of Schenectady, N.Y.

[73] Assignee: General Electric Company, Cincinnati, Ohio

[21] Appl. No.: 832,973

[22] Filed: Feb. 25, 1986

[51] Int. Cl.$^4$ ............................................. G21K 1/00
[52] U.S. Cl. .................................. 378/205; 378/145; 378/152
[58] Field of Search ............... 378/205, 150, 151, 152, 378/207, 145; 250/491.1

[56] References Cited

U.S. PATENT DOCUMENTS 4,675,892 6/1987 Plessis et al. ..................... 378/145

FOREIGN PATENT DOCUMENTS

2361155 6/1975 Fed. Rep. of Germany ...... 378/205

Primary Examiner—Carolyn E. Fields
Assistant Examiner—David P. Porta
Attorney, Agent, or Firm—Derek P. Lawrence; Nathan D. Herkamp

[57] ABSTRACT

An X-ray inspection system includes an X-ray source for generating a directed X-ray beam and a linear array detector for measuring the intensity of the received radiation and generating electrical signals representative thereof. A method for aligning the detector with the directed X-ray beam includes removing any part between the X-ray source and the detector, opening an X-ray beam limiter, positioning the linear array detector for maximum signal from each detector element, reducing the X-ray beam limiter opening, detecting whether any signal from a detector element is reduced, moving the limiter for producing a maximum signal on each signal, securing the X-ray beam limiter, and positioning the detector array for maximum signal.

2 Claims, 5 Drawing Sheets

METHOD OF ALIGNING A LINEAR ARRAY X-RAY DETECTOR

BACKGROUND OF THE INVENTION

A. Field of the Invention

This invention generally relates to a method of aligning an X-ray source and an X-ray detector, and more particularly, to aligning a linear array X-ray detector in a automated, digital X-ray inspection system for evaluating aircraft engine gas turbine blades.

B. Discussion

The manufacture of high performance, fuel efficient aircraft turbine blades has led to the development of turbine blades containing complex interior passages and openings to the blade surface for blade cooling. Performance and life of the blades is dependent upon the manufacture of these interior structures within specifications. A high possibility exists for blade failure because of machinery damage, incompletion of mission, and hazard to personnel. For these reasons 100% inspection of turbine blades is important to the public and a higher automated digital X-ray inspection system has long been desired.

An X-ray inspection station for evaluating the turbine blades includes an X-ray machine and an X-ray image system. The X-ray machine includes a X-ray source for directing X-ray beam radiation, a linear array X-ray detector for receiving the radiation and producing electrical signals representative thereof, manipulating parts, and means for controlling the flow of parts to the X-ray machine. The X-ray image system includes computer hardware and software for acquiring X-ray data, image generation, archiving, displaying, performing computations, and controlling the X-ray machine. The system is a production type automated inspection module capable of detecting internal flaws in jet engine single turbine blades. The X-ray inspection system manually or automatically performs X-ray computer tomography or digital fluoroscopy inspection on the gas turbine engine blades. Any blade is loaded into a gripper and then placed on a conveyor belt. The blade and gripper are then automatically advanced to a part inspection station. A part manipulator moves the blade and gripper from the conveyor inspection system and moves the gripper and blade into the X-ray beam. The part manipulator has two axes of movement, a vertical translation perpendicular to the X-ray beam and a rotational movement about the perpendicular axis. The part manipulator moves the blade linearly for generating a digital fluoroscopy image. The part manipulator rotates the blade in the X-ray beam for generating a computed tomography. After the scan is complete the blade is returned to the conveyor. As the blades are advanced by the conveyor they are moved to an unload station where they are removed by an operator.

It is an object of the present invention to provide a method for aligning the linear array X-ray detector to the directed beam from the X-ray source.

SUMMARY

The X-ray inspection system includes an X-ray source for generating a directed X-ray radiation beam and an x-ray detector having a linear array of detector elements for receiving radiation and generating electrical signals representative thereof. For maximum detector element signals, the linear array detector is aligned with the directed X-ray beam radiation. The method comprises removing any part between the X-ray source and the linear array detector, opening an X-ray beam limiter, positioning the linear array detector for maximum signal from each detector element, reducing the X-ray beam limiter opening, evaluating the signal from each detector element, moving the X-ray beam limiter for maximum detector element signals securing the X-ray beam limiter, and positioning the linear array detector for maximum signal.

GENERAL DESCRIPTION

Figure 1:
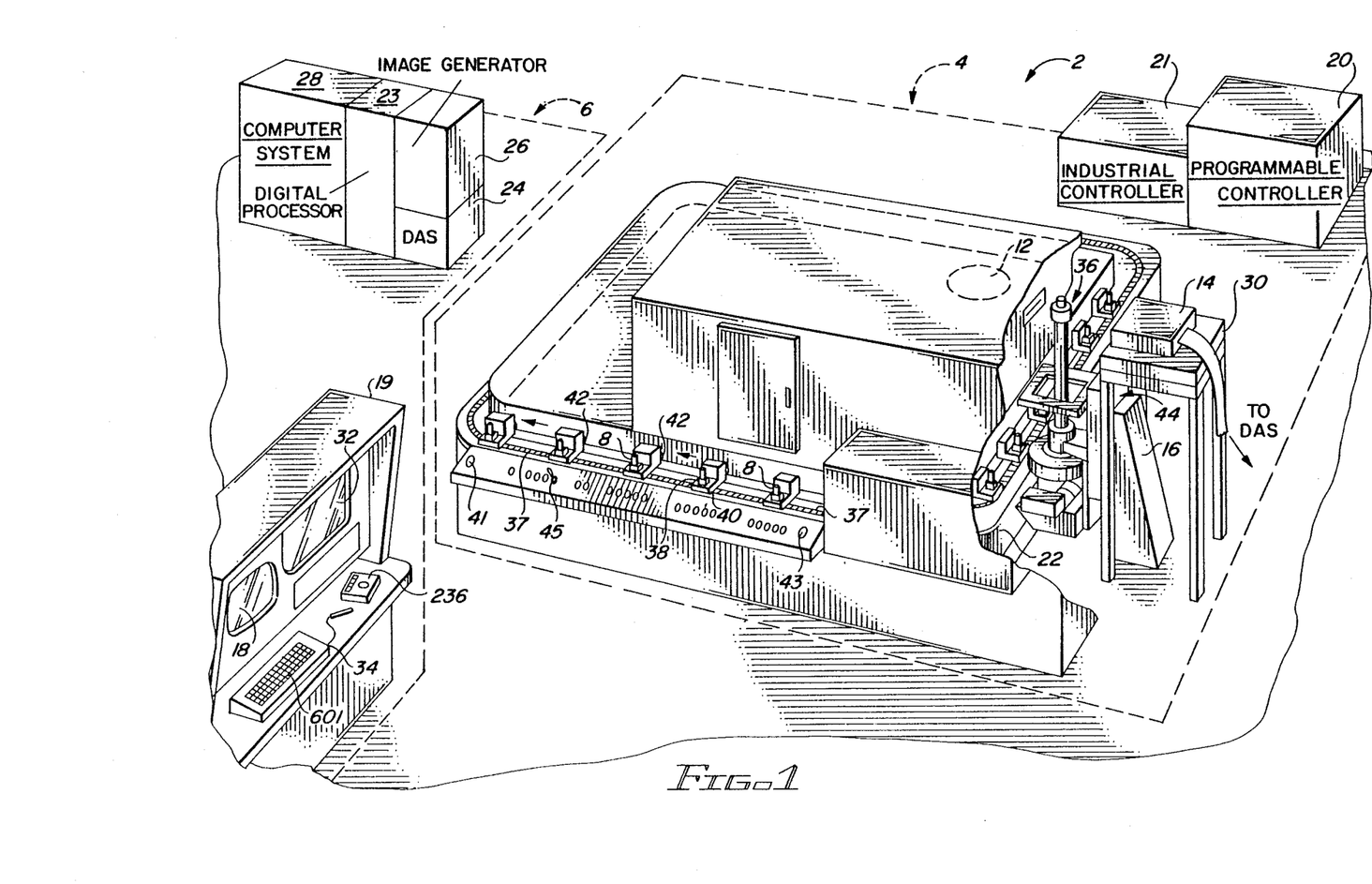
FIG. 1 illustrates the basic components of the X-ray inspection system.

FIG. 1 illustrates the basic components of the X-ray inspection system 2. The X-ray inspection system 2 includes a X-ray machine 4 and a X-ray image system 6. The X-ray machine 4 comprises a X-ray source 12, a X-ray detector 14, a part manipulator 16, a programmable controller 20, an industrial controller 21, a 6 axis movable platform 30 and a conveyor belt system 22. The X-ray image system 6 includes a data acquisition sytem 24, an image generation system 26, a computer system 28, an operator console 19, an operator display 18, a keyboard 601, a display processor 23, a high resolution display 32, and a bar code reader 34.

Figure 2:
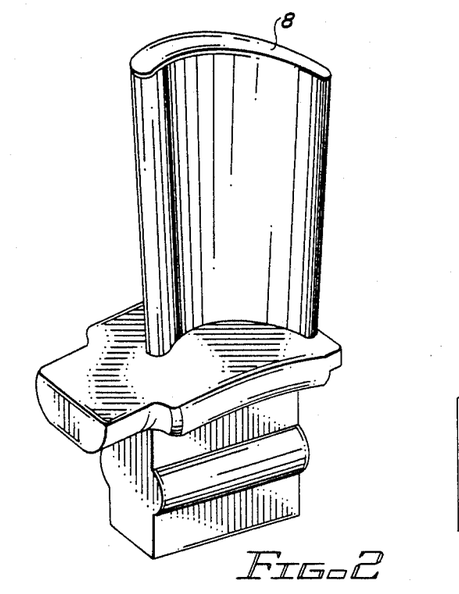
FIG. 2 is an engine turbine blade.

Parts 8, such as aircraft engine blades, are carried into the X-ray machine 4 by conveyor belt system 22. While the present invention is described hereinafter with particular reference to blades, it is to be understood at the outset of the description which follows that it contemplated that the apparatus and methods in accordance with the present invention may process numerous other manufactured parts. These include but are not limited to various parts of turbine engines, such as compressor or turbine blades, vanes, nozzles, thermocouples, etc. FIG. 2 illustrates a typical engine blade Referring back to FIG. 1, an operator loads a blade 8 into a gripper 38 which is held to the conveyor 22 by a pallet 40 supported on the conveyor 22 system by rollers 42.

Figure 3A:
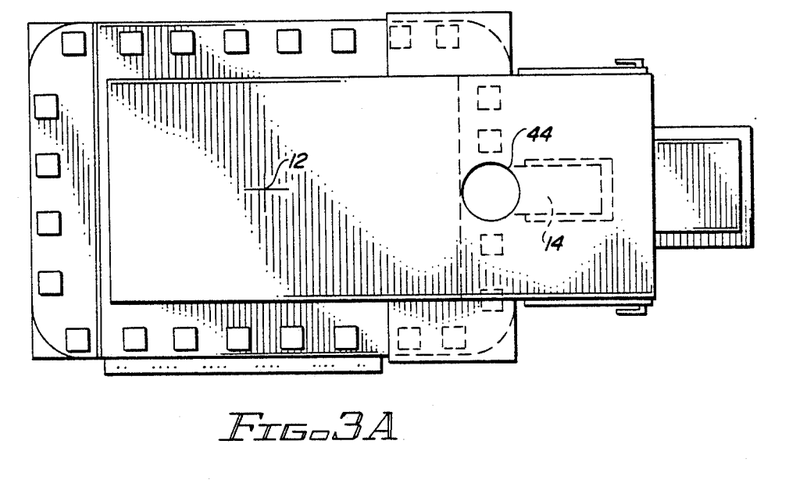
FIGS. 3A–B shows a schematic diagram of the conveyor system and lead shielded chamber.
Figure 3B:
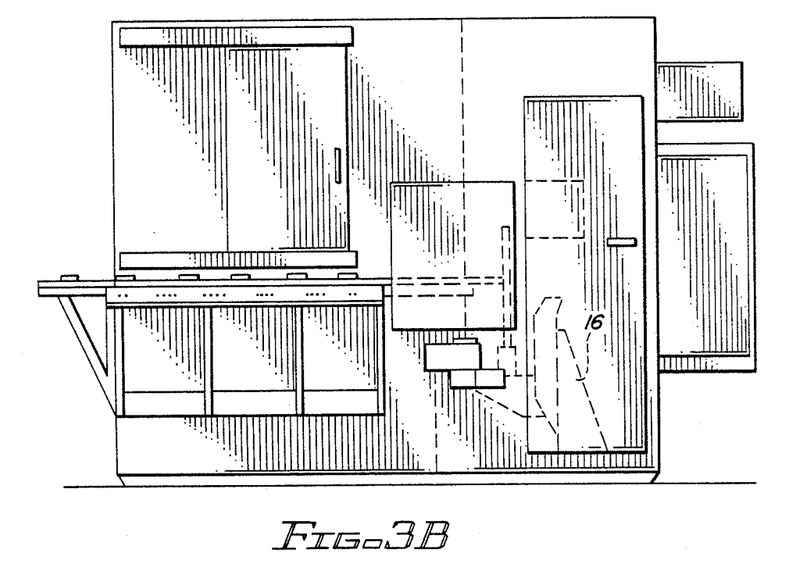

The operator informs the X-ray inspection system 2 of the part number of the blade and the type of inspection required. The operator simultaneously presses the start buttons 41 and 43. The conveyor 22 advances the blade 8 as shown in the direction of the arrow through 18 stations or positions to an inspection station 44. The inspection station 44 is inside a lead shielded chamber (shown in FIG. 3). The numerically controlled part manipulator 16 removes the gripper 38 with the blade 8 from the conveyor 22 and positions it in an appropiate path 36 through a directed X-ray beam 13 between the X-ray source 12 and X-ray detector 14.

The X-ray image system 6, following an inspection blade plan, produces a digital fluoroscopy image or a computed tomography image. For digital fluoroscopy images, hereinafter referred to as DF images, the blade 8 is held at a constant angular position and moved by the part manipulator 16 vertically through the X-ray beam. For computed tomography images, hereinafter referred to as CT images, the blade 8 is held at a constant vertical position and rotated by the part manipulator 16 up to 360 degrees. Every 60th of a second the intensity of the transmitted X-rays is collected from 636 horizontal detector elements of the X-ray detector 14 by the data acquisition system 24. The collected data are fed from the data aquisition system 24 to the image generating system 26, where it is normalized for changes in X-ray tube output, channel gain, and sensitivity variations. The data is then corrected for beam hardening. In the case of a DF image in which the blade 8 scanned vertically, the data is stored on the computer system 28. In the case of CT images, in which the part is rotated, further processing by convolution and back projection for obtaining the CT image is done in the image generator 26. The CT image is then transferred to the computer system 28 for display and storage. After all DF images and CT images are collected by the computer system 28 the part manipulator 16 returns the blade 8 part to the conveyor 36. The conveyor 22 advances, and a blade 8 eventually emerges from the X-ray chamber to the first of three unload stations 46, 48 and 50. The computer system 28 analyzes the DF or CT image for identifying the location of rejectable flaws in the blade. In manual mode, the operator determines the flaw location and measures the flaws. The operator then determines the disposition of the part or if further analysis, such as a CT image is required an automatic flaw analysis process determines whether the blade is acceptable, rejectable, or requires further inspection. A flaw report is generated and lights on the unload station are activated for notifing the operator of the blade disposition.

The X-ray image system 6 controls part flow, computer task coordination, operator validation and logging, X-ray warmup and logging, blade imaging, data acquisition, flaw detection, quality control plan execution, part image archiving, part flow analysis, and part report generation. In automatic mode, the X-ray image system 6 performs automatic image analyis in real time. The image data for a blade is obtained in real time while the blade is being manipulated.

FIGS. 3A-B show a schematic diagram of the conveyor 22 and the lead shielded chamber. The X-ray inspection system processes blades in a sequental fashion, dictated by the physical part conveyor 22. The thoughput of the X-ray image system is limited by the scan time of the blade and the processing time of the blade. The blade scan time is a function of the physics of X-raying the blade, the data acquisition system 24, the size of the blade, and the type of scan (DF or CT). Blade processing time is a function of the size of the blade image, the processing to be applied to the image, and the number of images for the blade. The X-ray image system processes a blade during the scan time of the blade or next balde for achieving real time operation.

The X-ray inspection system operates in either manual or automatic mode. In manual the sytem allows the operator to make a blade image, display the image, blade disposition, and repeat if necessary. The automatic mode performs automatic flaw detection and flaw analysis, and blade disposition. For a more detailed description of the X-ray inspection system reference is made to U.S. patent application Ser. No. 832,511 titled X-Ray Inspection System, filed concurrently herewith, assigned to General Electric Company, the disclosure which is hereby incorporated by reference.

X-RAY SOURCE

Figure 4:
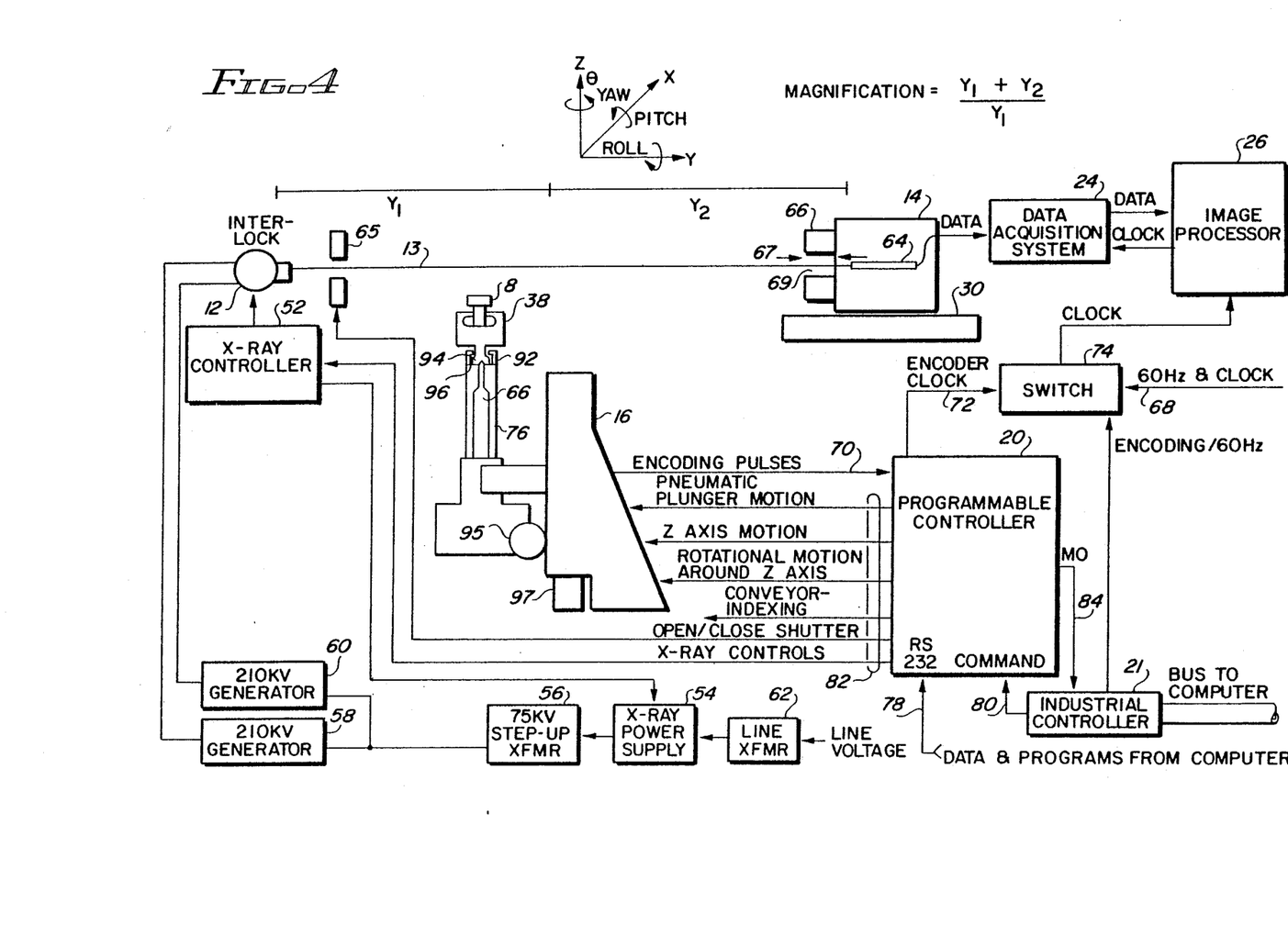
FIG. 4 illustrates the electromechanical apparatus of the X-ray machine.

FIG. 4 illustrates the electomechanical apparatus of the X-ray machine 4. The X-ray source includes a X-ray control unit 52, an X-ray power supply 54, a 75 KV step up transformer 56, two 210 KV high tension generators 58 and 60, the X-ray tube 12 and an oil cooler (not shown). The line power is fed through the X-ray power supply 54 to the 75 KV step up transformer. Each high tension generator (58 and 60) is fed from the 75 KV step up transformer 56. Each high tension generator applies its potential across the tube to generate a 420 KV potential, 210 KV from generator 58 to the tube and 210 KV from generator 60 to the tube for generating 420 KV accelerating potential in a manner well known in the art.

The X-ray controller 52 regulates beam current, filament current and filament voltage. The X-ray controller 52 has safety interlocking circuitry for shutting the X-ray source 12 off if over temperature, over wattage, or X-ray machine door openings are sensed. Basically, the X-ray controller 52 controls the filament voltage and current, monitors the temperature and flow of cooling oil, shuts the system down if temperature or current exceed predetermined values, and monitors X-ray machine access door openings. The oil cooler draws the heat away from the tungsten target in the X-ray tube. The oil cooler is an oil to air heat exchanger.

A kilovoltage level for the X-ray tube is set manually or is set by the X-ray controller 52 in the X-ray power supply 54 by a D/A convertor circuit in response to commands from the programmable controller 20. For a detailed description of the function of the programmable controller attention is directed to section 7 of the disclosure of U.S. patent application Ser. No. 832,511. The voltage from the X-ray controller, proportional to the X-ray tube kilovoltage needed by the X-ray tube, drives a servo system in the X-ray power supply 54. The servo system drives a roller in the power supply 54 to an appropriate tap point. To achieve a constant voltage on the X-ray tube a motor drive is disabled which moves the roller in the power supply 54. The motor drive servo system is disabled while data are being taken. The servo system has a very long time constant and is underdamped. In response to changing input line voltage conditions, large overcorrection and undercorrection voltage swings occur on the input to the X-ray tube. To minimize the input line variation, a line stabilizing transformer 62 with a harmonic filter on the output is used. The line stabilizing transformer 62 minimizes voltage changes in the input to the X-ray tube. The above steps archive a constant voltage on the X-ray tubes.

Since the X-ray inspection sytem is developed for a factory environment, throughput is a crucial concern. In order to keep up with production rates, one DF image every 30 seconds is obtained. For an 1800 line image, this requires each line of the image to be acquired in 1/60 second. If desired, the system allows synchronization of data acquisition through the power line frequency and to minimize the effects of noise in the system. For the 420 KVP X-ray tube used in this system, a reasonable signal to noise signal is achieved in 1/60 second. For better results the data from more than one data acquisition can be averaged.

X-RAY DETECTOR

A. Linear Array Detector

Referring to FIG. 4, there is also shown the scanning apparatus of the X-ray machine 4. The X-ray source 12 generates a directed X-ray beam along the Y axis through a X-ray source limitor 65 to an X-ray detector 14. The X-ray detector 14 includes a beam collimator 66 which prevents scattered radiation from impinging upon a linear array detector 64. The detector collimator 66 extends in front of the detector to eliminate as much background radiation from the X-ray source as possible. The linear array detector 64 includes 640 individual detector elements aligned along the horizontal axis X. The detector 14 consists of an ionized chamber X-ray detector including a parallel plate capacitor with gas dielectic along with a high voltage power supply and a charge measuring device. Incident X-rays ionize the dielectic material and the ions which are formed are swept to the collector plates under the influence of an applied electric field. The measured current is proportional to the incident X-ray flux and is relatively independent of the applied voltage over a wide range of voltages. For a more detailed description of the ionized chamber and X-ray detector array reference is made to U.S. patent application Ser. No. 565,670, titled Ionization Detector, filed Dec. 27, 1983, assigned to General Electric Company, the disclosure of which is hereby incorporated by reference.

The detector 14 is assembled in a very precise manner to align the detector collimator and the detector elements exactly with the X-ray beam axis. The method of assembling the detector and collimator is described in U.S. patent application Ser. No. 832,981 titled Method of Aligning a Collimator to a Linear Array X-ray Detector, filed Feb. 25, 1986, and assigned to General Electric, which is hereby incorporated by reference.

The X-ray detector consists of 600 data channels. In addition to the 600 data channels in the X-ray detector 64, 36 reference channels are provided. There are 18 reference channels on each side of the primary array and separate from it by 220 mils. The reference detectors have two major functions. The first is to take account of fluctuations in the X-ray source in intensity. In addition, the reference channels are outside the part envelope and hence have a direct air path to the source. That is, the X-ray source impinges on the reference channels without passing through the blade. Any change in signal level in these channels is related to changes in source intensity. The data channels are normalized to the average value in the reference channel during each data acquisition interval.

Figure 5:
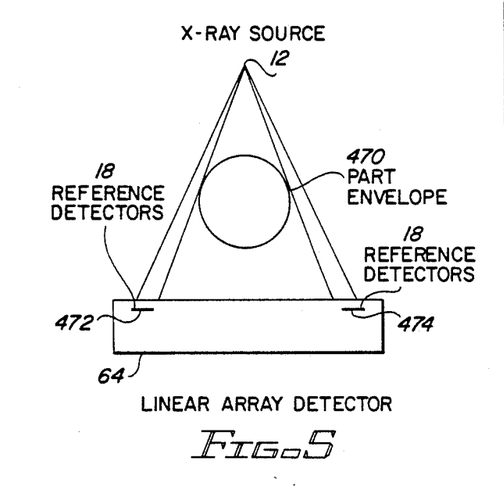
FIG. 5 shows a diagram of the X-ray source, X-ray detector, and part envelope.

Referring to FIG. 5, there is shown a top view of the X-ray source and linear array detector 64. The area outlined generally by 470 is the area occupied by a part such as a turbine blade. A bank of reference detectors 472 sample the X-ray level on a first side of the part envelope 470 for determining a first reference level. Another bank of reference detectors 474 are positioned on the opposite side of the part envelope for measuring the flux level of the X-ray source for determining a second reference level. To normalize the data channel signals, a predetermined number of reference detector channels are averaged and the results divided into the data channel values.

The second function of the reference detectors is to account for small differences in the data acquisition interval from cycle to cycle. With the 60 HZ power line as a reference clock 68, this effect is rather small for the most part, though in a factory environment, the power line period can vary by tens of micro seconds from its nominal rate. Variations in the vertical step size for DF data acquisition occur if the 60 HZ clock 68 is used. This causes variable pixel sizes in the image which can cause difficulty in interpretation. Though the effect is rather small it is sometimes preferable to assure the step size is the same for all steps (e.g. in vertical resolution measurements). The exact size of the increment is not important. It is the fact that the increment is always the same which is imporant. Therefore, it is useful to use a frequency reference other than the power line frequency 68. In particular, the part manipulator for positioning the part moves with nearly constant velocity. An encoder pulse 70 is generated by the part manipulator every time the blade is moved approximately 5 mils. The encoder pulse 70 is fed to the programmable controller 20 which generates an encoder clock signal 72 which is fed to switch 74. Switch 74 is controlled by the industrial controller 21. The switch 74 allows either the encoder clock 72 or the 60 HZ clock 68 to be applied to the image generator 26 which provides the clock signal to the data acquisition system. In the case where the clock to the data acquisition system is from the encoder clock 72, slight variations in the data acquisition time can also occur. This, of course, causes changes in the amplitude of the reference signal. These changes are accounted for by normalization of the data channels in the X-ray detector with the reference detectors. Thus the reference detectors compensate for any change in signal level from the X-ray source and any changes caused by variations in either the 60 HZ clock 68 or the encoder clock 72.

In order to achieve a spatial resolution on the order of 10 mils, the sampling theorem requires measurements based on 5 mil centers. Since all the data across the width of the blade are taken simultaneously by the linear array detector, this requires that the individual detector elements be spaced on 5 mils centers. In order to achieve comparable resolution of the vertical resolution of DF imaging, a resolution of 10 mils with data taken in 5 mils steps is again required. Spatial resolution is achieved by beam collimator 66 which includes two tungsten blocks thick enough to attenuate the incident beam by a factor of 1000 and are spaced 11.5 mils apart in front of the ionization chamber (vertical spacing due to the geometry of the imaging system). The plates of the capacitor which form the detector are spaced apart in order to avoid X-rays directly incident on the collector plates. This spacing determines the detector voltage required to achieve the desired detector response time. Spatial resolution requirements set the spacing of the individual detector elements and the size of vertical movement increment.

The maximum blade size sets the overall dimensions of detector 14, the required number of individual elements, and the number of steps in the vertical scan to complete a full DF image. A typical turbine blade fits in the part envelope 470 three inches wide by nine inches high. In a three inch wide detector with elements spaced every 5 mils, 600 detector elements are required.

The detector 14 can be moved in any one direction of six axes by platform 30. The platform 30 moves in the X,Y,Z direction or rotates about any one of the axes in a manner well known in the art.

B. Method of Aligning the Detector

Figure 6:
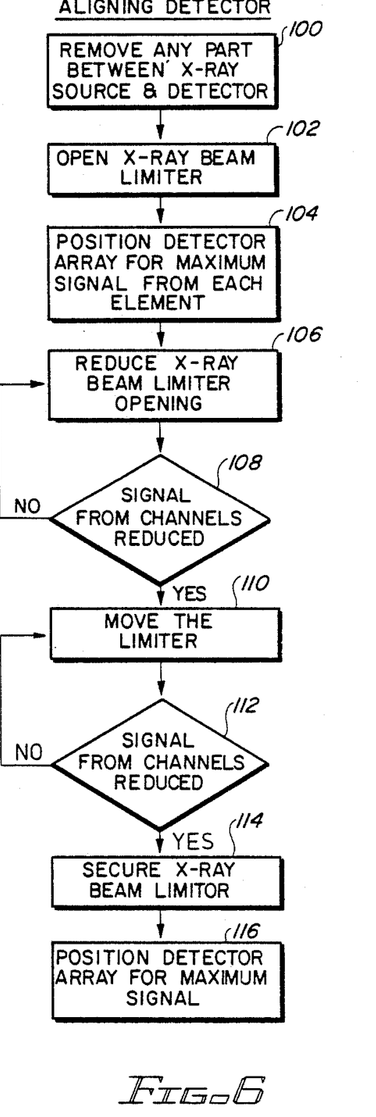
FIG. 6 is a method for aligning the detector to the X-ray source.

Before using the X-ray machine, the linear array detector 64 is aligned with the X-ray source 12. The linear array detector 64 includes 640 individual detector elements aligned along the horizontal axis X. In actual use 600 detector elements are data channels, 36 detector elements are reference channels and 4 channels are reserved. The signal from each channel is fed to the horizontal axis of an oscilloscope for displaying the intensity received by each channel from the X-ray source. The vertical axis on the oscilloscope represents the intensity. If each detector element measures the same intensity from the X-ray source, a constant level appears across the oscilloscope. The beam limiter 65 comprises two tungsten blocks separated from each other by approximately from 50 to 60 mils. A six axis platform 30 moves in the Z, X and Y direction and rotates about each axis for positioning the linear array detector 64. FIG. 6 is a flow diagram illustrating the process for aligning the X-ray detector 14.

First, an unobstructed path betwen the source and the detector is obtained, block 100. To begin the alignment procedure, the X-ray source beam limiter 65 is open to prevent attenuation on the detector array 64, block 102. The six axis platform 30 then positions the linear array detector 64 for maximum signal possible from each detector channel, attempting to have detector array as horizontal as is possible, block 104. When the maximum signal from each detector channel is achieved, the opening on the X-ray beam limiter is reduced by half, block 106. If the intensity of the X-ray source does not drop, the width of the X-ray source beam limiter 65 is reduced until interference with the signal by limiter 65 is detected by the detector elements, block 108. The limiter 65 is then moved vertically and shifted about the X axis for achieving non-interference from the limiter 65, blocks 110 and 112. Moving the limiter 65 differentially up and down for maximum signal results in the limiter 65 centered symmetrically about the X-ray source beam. The purpose of the beam limiter 65 is to reduce the amount of extraneous radiation that strikes a blade. Reducing the amount of extraneous radiation that strikes the blade reduces the amount of scattered radiation from the blade which enters X-ray detector 14. The X-ray beam limiter 65 is then fixed in this position, block 114. Since the detector collimator 66 is securely fastened to the X-ray detector 14, the collimator 66 and detector 14 move as one unit. The depth 67 of the collimator 66 in the Y direction is approximately 750 mils. The opening 69 is approximately 12 mils. These dimensions reduce the amount of scattered radiation entering the detector 14. The depth 67 and height 69 of the collimator reduces the angle through which scattered radiation may enter the detector unattenuated. Reducing the amount of scattered radiation entering the detector 14 by increasing the height of the collimator 66 and decreasing the opening 69 produces a higher quality image than previously possible. Increasing the depth 67 and decreasing the opening 69 allows only radiation parallel to the Y axis to enter the detector. The detector 14 and collimator 66 are moved by the six axis platform 30 for producing a maximum signal, block 116. The detector array 64 and X-ray source 12 are now aligned for maximum signal.

Figure 7:
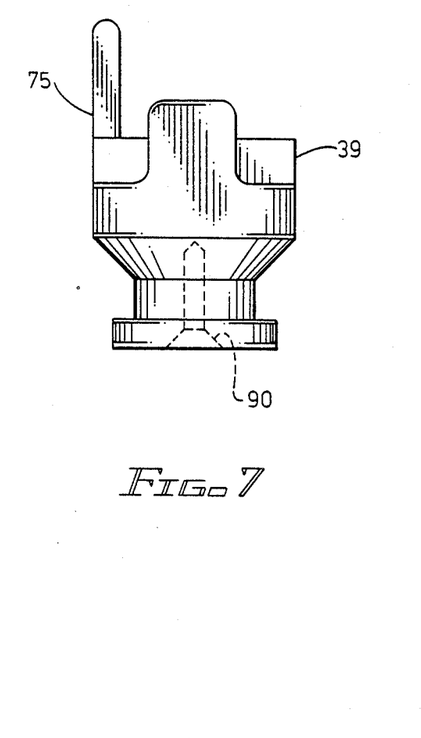
FIG. 7 is a gripper with an extension flange used for determining the center of the linear array detector.

One of the most crucial parts of aligning the detector is to make the center of the detector array colinear with the straight line drawn between the X-ray focal spot through the axis of rotation about the Z axis of the part manipulator mandrel. This function is accomplished by rotating the gripper 38 with an extension flange in the X-ray beam. FIG. 6 of U.S. patent application Ser. No. 832,511, shows a gripper 39 with an extension flange 75 of the type hereinafter referenced. Referring back to FIG. 4, of this application the center axis of rotation of the gripper 38 is the same as the center axis of rotation of the part manipulator mandrel 76. The gripper 38 is securely fastened and centered on the part manipulatior mandrel 76 by the plunger 66 being forced into a self-centering cavity. For a better understanding of the functional cooperation and components of the gripper 38 and part manipulator mandrel 7 attention is directed to FIGS. 9A–C of the U.S. patent application Ser. No. 832,511.

The oscilloscope trace is adjusted such that the data detectors span the entire oscilloscope face. The gripper 38 is held on the part manipulator mandrel 76, and rotated to place the extension flange on one edge of the detector array, and moved up into the X-ray beam 13 so only the extension flange intersects the beam 13 between the X-ray source 12 and the detector 14. The detector channels affected by the intersection of the flange 75 appear on the oscilloscope with a reduction in signal value compared to the majority of the other elements. From the edge of the flange a first edge detector element is accurately determined from the oscillosope. The gripper 38 is then rotated 180 degrees. A determination of a second measurement edge detector element is made. The linear array detector 64 is moved either right or left to make the first and second edge detector elements have the same relative position from each edge of the oscilloscope screen. This is checked by rotating the gripper 180 degrees, noting the position of the first edge detector, rotating the gripper 180 degrees and noting the second edge detectors position. In this iterative manner the linear array detector 64 is adjusted so the center of the detector array is nearly coincident with the axis of rotation about the Z axis of the part manipulator.

A precision brass cylinder (not shown) is then placed in the gripper. The brass cylinder provides a surface to measure the distance from the X-ray source focal point to the center of rotational axis of the part manipulator (Y1) and the distance between the linear array detector 64 and the center of rotational axis of the part manipulator (Y2). With parameters Y1 and Y2 the magification of the X-ray system is determined. The magnification is equal to (Y1+Y2)/Y1. Aligning the detector prevents scattered radiation from degrading the X-ray images, provides a higher resolution image, and improves signal to noise performance.

It is to be understood that the above described embodiment of the invention is illustrative only, and that modifications thereof may occur to those skilled in the art. Accordingly, this invention is not to be regarded as limited to the embodiment described herein, but is to be limited only as defined by the appended claims.

What is claimed is:

1. In a computer based system for non-destructive measuring and testing of manufactured parts, the system including an X-ray source for providing a beam of X-ray radiation, a beam limiter positioned in the beam of radiation and having an adjustable gap in at least one plane and being positionable in the at least one plane for establishing a directed beam of radiation, a linear array X-ray detector having a plurality of radiation detecting elements for converting detected radiation into electrical signals, the detector being generally oriented in the directed beam of radiation, and a collimator coupled to the detector for restricting radiation received by the detector to a predetermined range of approach angles, a method for aligning the detector to the directed beam of X-ray radiation comprising the steps of:

opening the beam limiter gap until each element of the linear array receives X-ray radiation unattenuated by the beam limiter;

positioning the linear array detector such that each radiation detecting element produces signals of maximum amplitude;

reducing the beam limiter gap until the signals from the detector begin to reduce in amplitude;

repositioning the beam limiter in the at least one plane such that the signals from the detector achieve another maximum amplitude; and positioning the linear array detector in the at least one plane until the radiation detecting elements produce signals of still another maximum amplitude.

2. The method of claim 1 wherein a part holder is positioned between the X-ray source and the detector, the part holder having an extension flange parallel to the at least one plane and extending into the directed beam of X-ray radiation, the method including the further steps of:

identifying first ones of the detecting elements aligned for receiving radiation passing through the flange;

rotating the part holder through 180 degrees;

identifying second ones of the detecting elements aligned for receiving radiation passing through the flange in the rotated position; and displacing the detector in a plane perpendicular to the at least one plane until the first ones and second ones of the detecting elements are equally spaced from a center of the detector.

* * * * *